(12) United States Patent
Albertus et al.

(10) Patent No.: US 9,531,047 B2
(45) Date of Patent: Dec. 27, 2016

(54) METAL/OXYGEN BATTERY WITH GROWTH PROMOTING STRUCTURE

(71) Applicant: Robert Bosch GmbH, Stuttgart (DE)

(72) Inventors: Paul Albertus, Mountain View, CA (US); John F. Christensen, Mountain View, CA (US); Timm Lohmann, Mountain View, CA (US); Roel Sanchez-Carrera, Somerville, MA (US); Boris Kozinsky, Waban, MA (US); Christina Johnston, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 13/953,908

(22) Filed: Jul. 30, 2013

(65) Prior Publication Data

US 2014/0030612 A1    Jan. 30, 2014

Related U.S. Application Data

(60) Provisional application No. 61/677,409, filed on Jul. 30, 2012.

(51) Int. Cl.
*H01M 12/08* (2006.01)
*H01M 8/00* (2016.01)
*H01M 4/86* (2006.01)
*H01M 4/04* (2006.01)
*H01M 4/38* (2006.01)
(Continued)

(52) U.S. Cl.
CPC ........... *H01M 12/08* (2013.01); *H01M 4/8615* (2013.01); *H01M 4/8663* (2013.01); *H01M 4/8673* (2013.01); *H01M 8/00* (2013.01);
*H01M 4/0421* (2013.01); *H01M 4/382* (2013.01); *H01M 4/9041* (2013.01); *H01M 4/92* (2013.01); *H01M 2004/8689* (2013.01); *H01M 2220/20* (2013.01); *Y02E 60/50* (2013.01)

(58) Field of Classification Search
CPC ............................. H01M 12/08; H01M 4/624
See application file for complete search history.

(56) References Cited

U.S. PATENT DOCUMENTS

| | | | |
|---|---|---|---|
| 2011/0059355 A1* | 3/2011 | Zhang | H01M 4/8647 429/188 |
| 2011/0123897 A1 | 5/2011 | Kawaji et al. | |
| 2012/0009503 A1 | 1/2012 | Haug et al. | |

(Continued)

FOREIGN PATENT DOCUMENTS

WO    2012023013 A1    2/2012

OTHER PUBLICATIONS

Abraham et al., "A polymer electrolyte-based rechargeable lithium/oxygen battery", Journal of the Electrochemical Society; 1996; pp. 1-5; vol. 143, No. 1; Norwood, USA (5 pages).

(Continued)

*Primary Examiner* — Jonathan Jelsma
(74) *Attorney, Agent, or Firm* — Maginot Moore & Beck LLP

(57) ABSTRACT

In one embodiment, an electrochemical cell includes a negative electrode, a porous separator adjacent to the negative electrode, and a positive electrode separated from the negative electrode by the porous separator, the positive electrode including a conductive matrix and a plurality of insulator particles extending from the conductive matrix.

19 Claims, 7 Drawing Sheets

(51) Int. Cl.
*H01M 4/90* (2006.01)
*H01M 4/92* (2006.01)

(56) References Cited

U.S. PATENT DOCUMENTS

2012/0021302 A1 1/2012 Bulan et al.
2012/0094193 A1* 4/2012 Albertus et al. .............. 429/339

OTHER PUBLICATIONS

Amatucci et al., "Flouride based electrode materials for advanced energy storage devices," Journal of Flourine Chemistry; 2007; pp. 243-262; vol. 128, No. 4; Elsevier; North Brunswick, USA (20 pages).
Beattie et al., "High-Capacity Lithium-Air Cathodes", Journal of the Electrochemical Society; 2008; vol. 156; Canada (13 pages).
Cabana et al., "Beyond Intercalation-Based Li-Ion Batteries: The State of the Art and Challenges of Electrode Materials Reacting Through Conversion Reactions", Advanced Materials; 2010; pp. E170-E192; vol. 22, No. 35; Wiley; Europe (23 pages).
Kumar et al., "A Solid-State, Rechargeable, Long Cycle Life Lithium-Air Battery", Journal of the Electrochemical Society; 2010; pp. A50-A54; vol. 157, No. 1; Needham, USA (5 pages).
Ogasawara et al., "Rechargeable $Li_2O_2$ Electrode for Lithium Batteries", Journal of the American Chemical Society; 2006; pp. 1390-1393; vol. 128, No. 4; Switzerland (4 pages).
Read, "Characterization of the Lithium/Oxygen Organic Electrolyte Battery," Journal of the Electrochemical Society; 2002; pp. A1190-A1195; vol. 149; Army Research Laboratory, Adelphi, USA (6 pages).
Read et al., "Oxygen Transport Properties of Organic Electrolytes and Performance of Lithium/Oxygen Battery", Journal of the Electrochemical Society; 2003; pp. A1351-A1356; vol. 150, No. 10; Army Research Laboratory, Adelphi, USA (6 pages).
USABC Goals for Advanced Batteries (1 page).
Yang et al., "The effect of oxygen pressures on the electrochemical profile of lithium/oxygen battery", Journal of Solid State Electrochemistry; 2010; pp. 109-114; Springer-Verlag; China (6 pages).
Zheng et al., "Theoretical Energy Density of Li-Air Batteries", Journal of the Electrochemical Society; 2008; pp. A432-A437; vol. 155, No. 6; USA (6 pages).
International Search Report and Written Opinion corresponding to PCT Application No. PCT/US2013/052686, mailed Oct. 14, 2013 (7 pages).

* cited by examiner

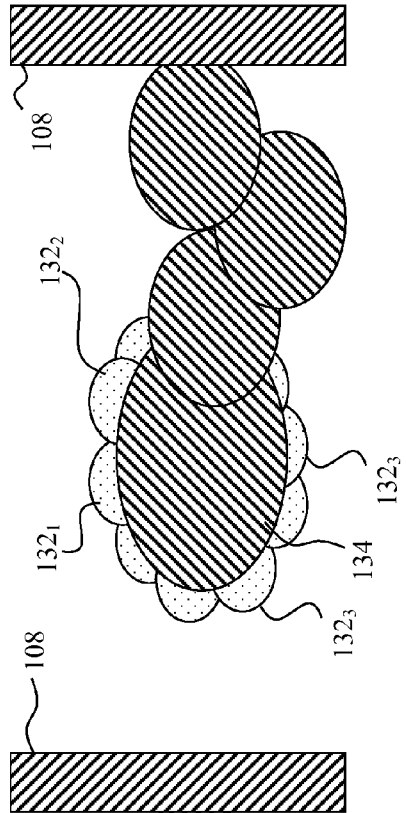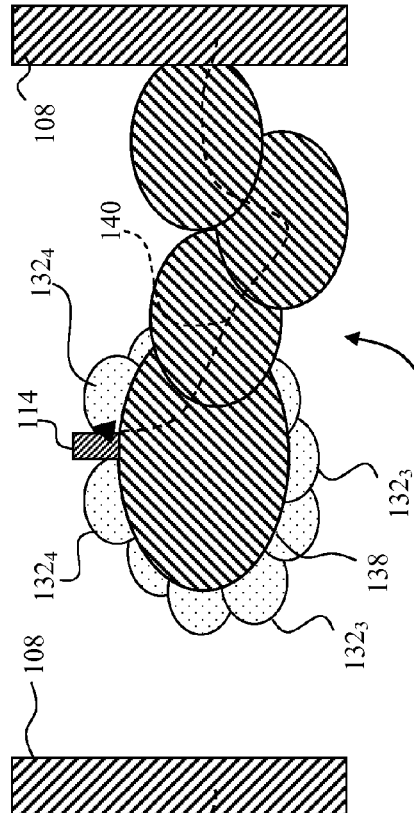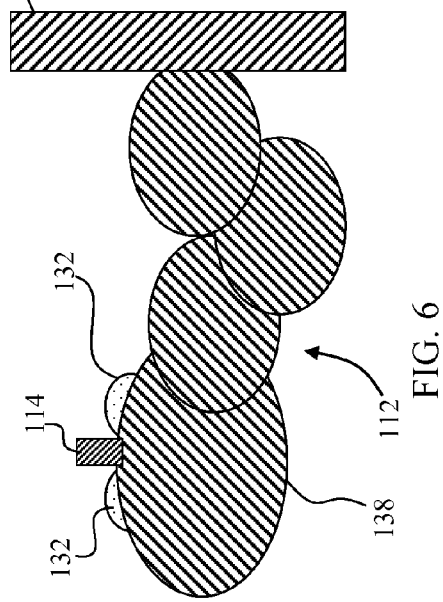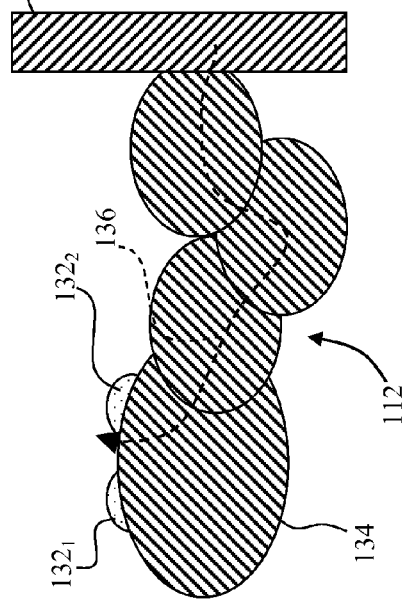
FIG. 6
FIG. 7
FIG. 8
FIG. 9

METAL/OXYGEN BATTERY WITH GROWTH PROMOTING STRUCTURE

This application claims the benefit of U.S. Provisional Application No. 61/677,409 filed Jul. 30, 2012, the entire contents of which is herein incorporated by reference.

TECHNICAL FIELD

This disclosure relates to batteries and more particularly to metal/oxygen based batteries.

BACKGROUND

Rechargeable lithium-ion batteries are attractive energy storage systems for portable electronics and electric and hybrid-electric vehicles because of their high specific energy compared to other electrochemical energy storage devices. As discussed more fully below, a typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3861 mAh/g. The highest theoretical capacity achievable for a lithium-ion positive electrode is 1794 mAh/g (based on the mass of the lithiated material), for $Li_2O$. Other high-capacity materials include $BiF_3$ (303 mAh/g, lithiated), $FeF_3$ (712 mAh/g, lithiated), and others. Unfortunately, all of these materials react with lithium at a lower voltage compared to conventional oxide positive electrodes, hence limiting the theoretical specific energy. Nonetheless, the theoretical specific energies are still very high (>800 Wh/kg, compared to a maximum of ~500 Wh/kg for a cell with lithium negative and conventional oxide positive electrodes, which may enable an electric vehicle to approach a range of 300 miles or more on a single charge.

FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, lithium/oxygen batteries, even allowing for packaging weight, are capable of providing a specific energy >600 Wh/kg and thus have the potential to enable driving ranges of electric vehicles of more than 300 miles without recharging, at a similar cost to typical lithium ion batteries. While lithium/oxygen cells have been demonstrated in controlled laboratory environments, a number of issues remain before full commercial introduction of a lithium/oxygen cell is viable as discussed further below.

A typical lithium/oxygen electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as $LiPF_6$ dissolved in an organic solvent such as dimethyl ether or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 52 is enclosed by a barrier 66. The barrier 66 in FIG. 3 is configured to allow oxygen from an external source 68 to enter the positive electrode 54 while filtering undesired components such as gases and fluids. The wetting properties of the positive electrode 54 prevent the electrolyte 64 from leaking out of the positive electrode 54. Alternatively, the removal of contaminants from an external source of oxygen, and the retention of cell components such as volatile electrolyte, may be carried out separately from the individual cells. Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are believed to combine to form a discharge product $Li_2O_2$ or $Li_2O$ in accordance with the following relationship:

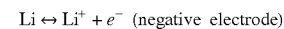

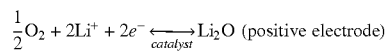

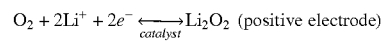

The positive electrode 54 in a typical cell 50 is a lightweight, electrically conductive material which has a porosity of at least 50% to allow the formation and deposition/storage of $Li_2O_2$ in the cathode volume. The ability to deposit the $Li_2O_2$ directly determines the maximum capacity of the cell.

In order to realize a battery system with a specific energy of 600 Wh/kg or greater, a plate with a thickness of 125 μm must have a capacity of about 20 mAh/cm².

Materials which provide the needed porosity include carbon black, graphite, carbon fibers, carbon nanotubes, and other non-carbon materials.

While some issues have been investigated, several challenges remain to be addressed for lithium-oxygen batteries. These challenges include limiting dendrite formation at the lithium metal surface, protecting the lithium metal (and possibly other materials) from moisture and other potentially harmful components of air (if the oxygen is obtained from the air), designing a system that achieves acceptable specific energy and specific power levels, reducing the hysteresis between the charge and discharge voltages (which limits the round-trip energy efficiency), and improving the number of cycles over which the system can be cycled reversibly.

One problem which has arisen in attempting to produce a practical $Li_2O_2$ battery is that the practical capacity of such batteries is substantially lower than the theoretical capacity. By way of example, FIG. 4 depicts a graph 80 with three discharge curves 82, 84, and 86. The discharge curve 82 indicates the realized voltage and capacity of a metal/oxygen battery when the battery is discharged at a rate of 0.1 mA. The discharge curve 82 includes a plateau region 88 that is well below the equilibrium potential 90 of the battery, indicating a high kinetic resistance. The difference between the equilibrium potential 90 and the discharge curve 82 indicates a large difference between the actual capacity of the battery and the theoretical capacity of the battery.

The discharge curves 84 and 86 indicate the realized voltage and capacity of the metal/oxygen battery when the battery is discharged at a rate of 0.5 mA and 1.0 mA, respectively. The curves 84 and 86 indicate that at higher rates of discharge, the difference between the actual capacity of the battery and the theoretical capacity of the battery increases.

What is needed therefore is a metal/oxygen battery that exhibits increased capacity compared to known metal/oxygen batteries. More specifically, a metal/oxygen battery which reduces the difference between practical capacity of the battery and the theoretical capacity of the battery would be beneficial. It would be further beneficial if such an improved metal/oxygen battery could be manufactured using known battery manufacturing processes.

SUMMARY

In one embodiment, an electrochemical cell includes a negative electrode, a porous separator adjacent to the negative electrode, and a positive electrode separated from the negative electrode by the porous separator, the positive electrode including a conductive matrix and a plurality of insulator particles extending from the conductive matrix.

In another embodiment, a method of forming an electrochemical cell includes forming a negative electrode, forming a porous separator, forming a positive electrode including a conductive matrix and a plurality of insulator particles extending from the conductive matrix, and positioning the porous separator between the negative electrode and the positive electrode.

BRIEF DESCRIPTION OF DRAWINGS

FIG. 6 depicts a portion of the porous electrode of FIG. 5 with an insulator particle attached to the porous electrode with discharge products forming on the surface of the porous electrode;

FIG. 7 depicts a portion of the porous electrode of FIG. 5 that does not include an insulator particle with discharge products forming on the surface of the porous electrode;

FIG. 8 depicts the portion of the porous electrode of FIG. 7 wherein discharge products have formed over the entire surface of a nodule of the porous electrode, thereby insulating the nodule from further electron transport to the $Li_2O_2$/electrolyte interface;

FIG. 9 depicts the portion of the porous electrode of FIG. 6 wherein discharge products have formed over substantially the entire surface of a nodule of the porous electrode, with the insulating particle/$Li_2O_2$ interface providing a pathway for electron transport, thereby allowing further electron transport to the $Li_2O_2$/electrolyte interface;

DETAILED DESCRIPTION

Figure 1:
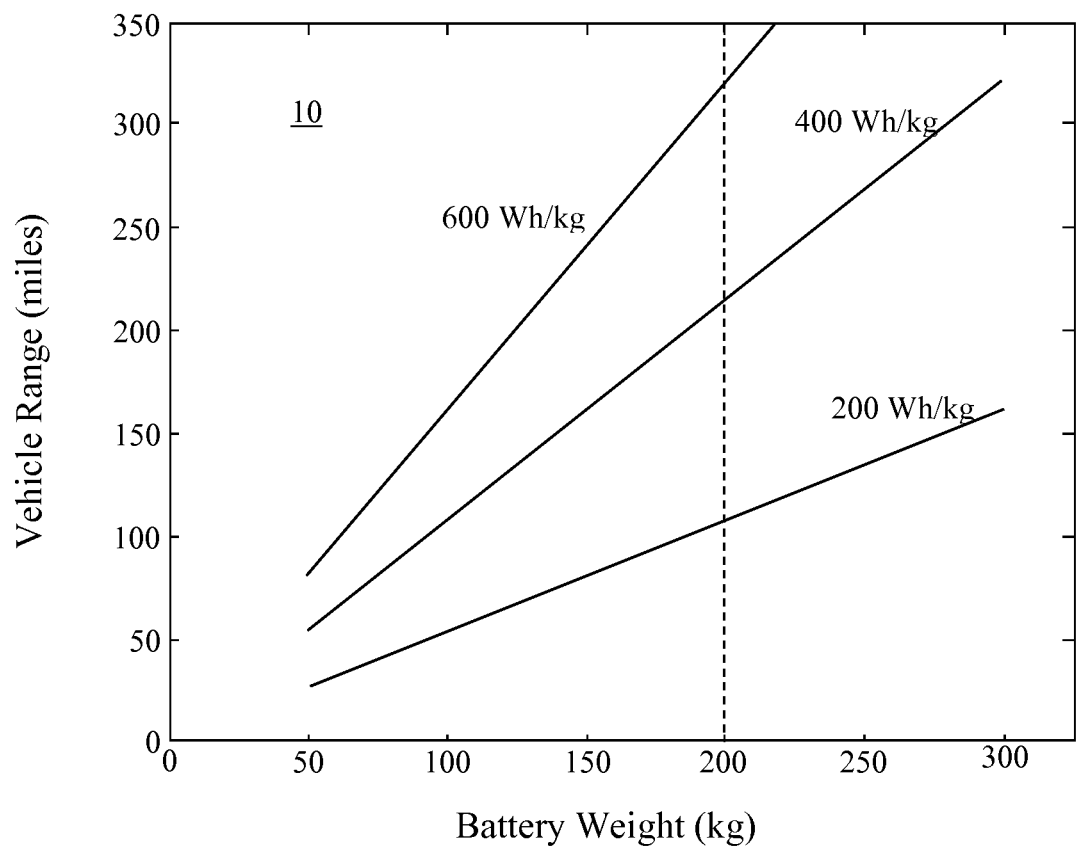
FIG. 1 depicts a plot showing the relationship between battery weight and vehicular range for various specific energies.
Figure 2:
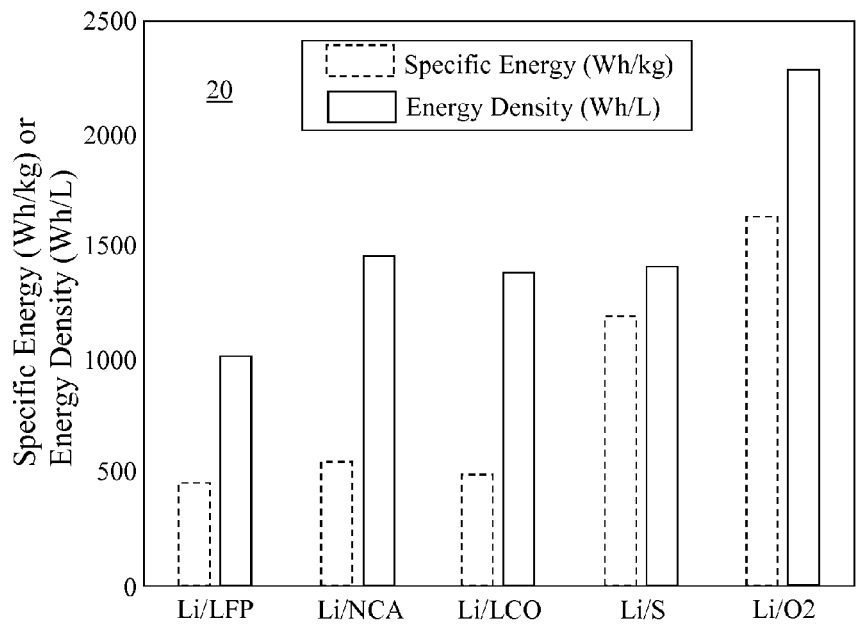
FIG. 2 depicts a chart of the specific energy and energy density of various lithium-based cells.
Figure 3:
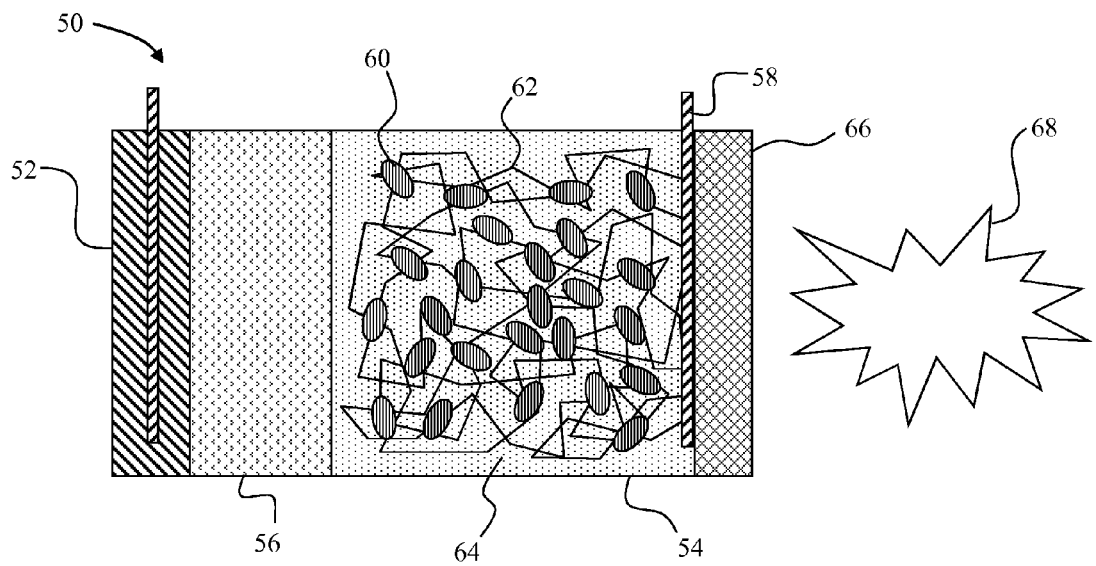
FIG. 3 depicts a prior art lithium-oxygen (Li/oxygen) cell including two electrodes, a separator, and an electrolyte.
Figure 4:
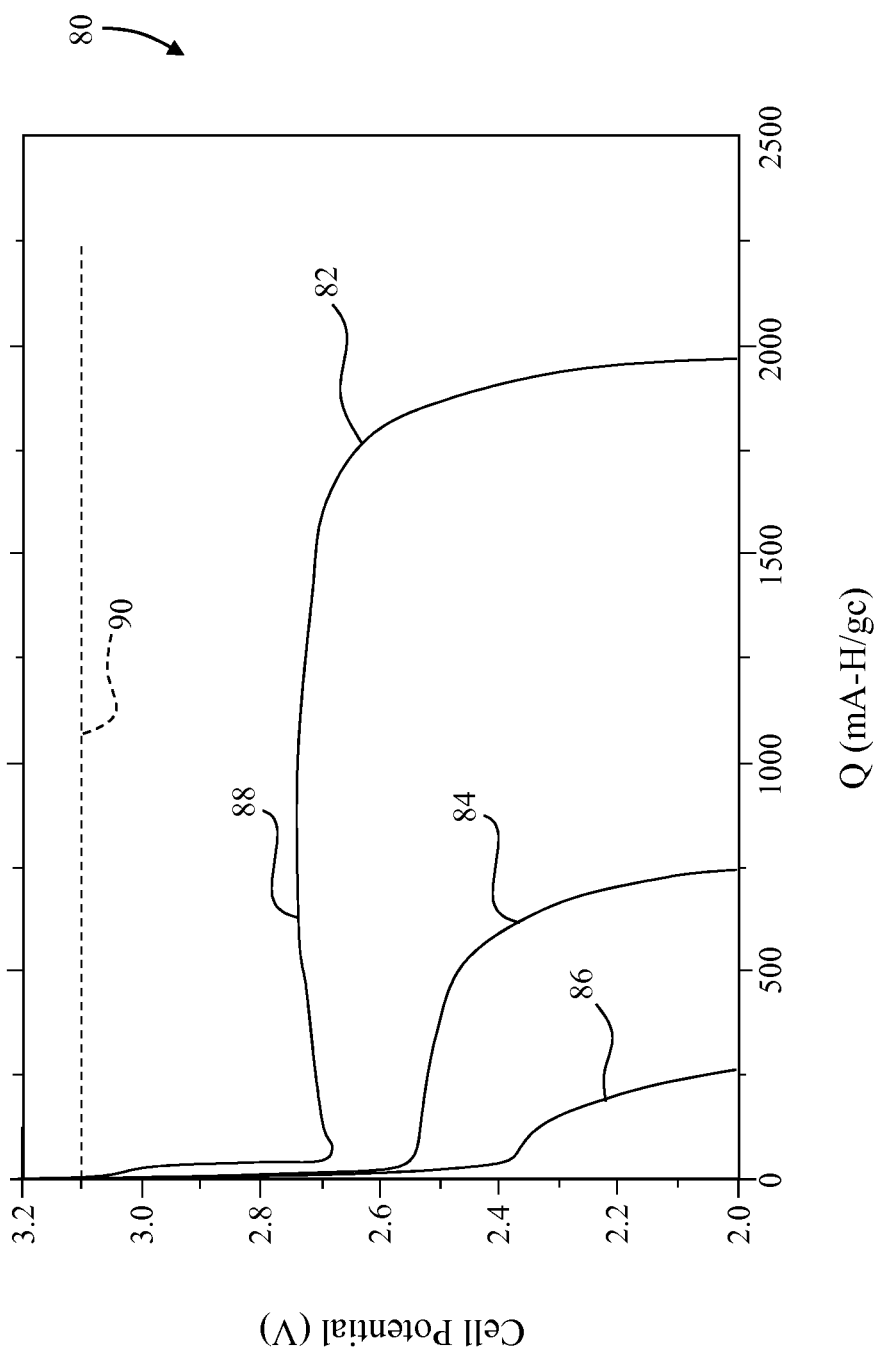
FIG. 4 depicts discharge curves for a metal/oxygen battery showing an increasing difference between the actual capacity of a battery and the theoretical capacity of the battery as the rate of discharge increases.
Figure 5:
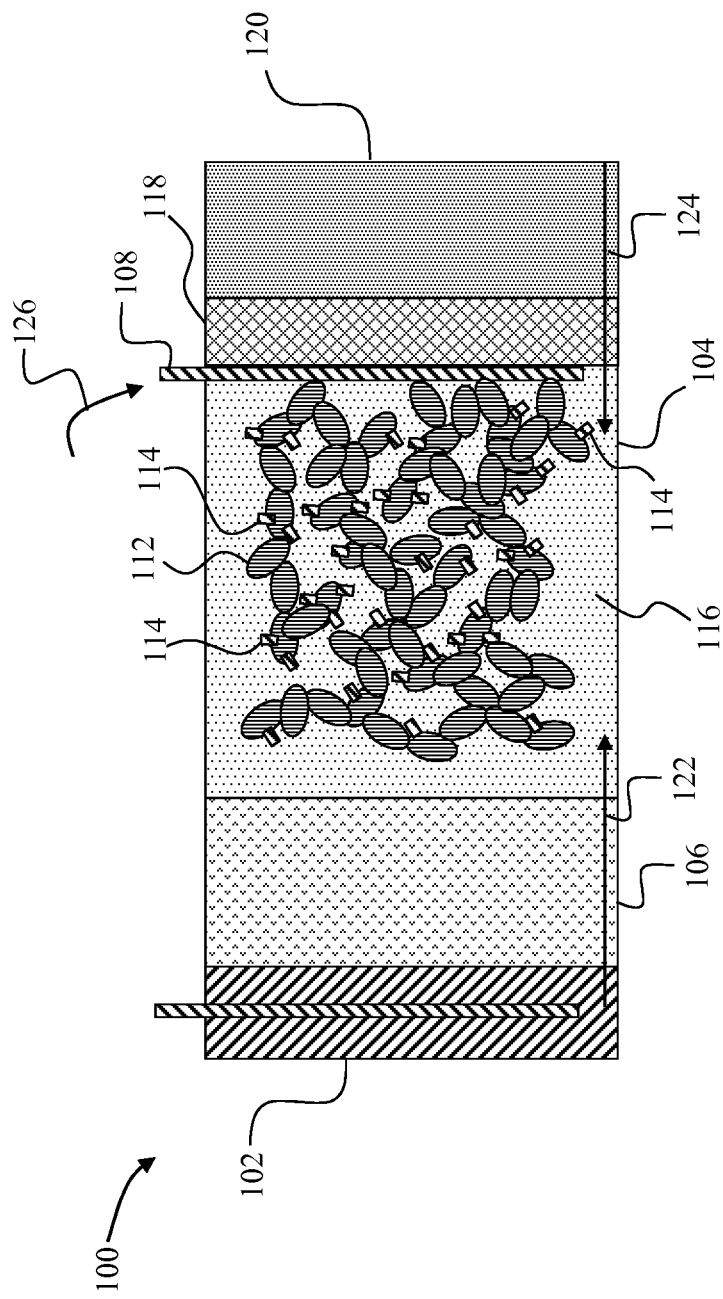
FIG. 5 depicts a schematic view of a lithium-oxygen (Li/oxygen) cell with two electrodes and a reservoir configured to exchange oxygen with a positive electrode for a reversible reaction with lithium.

A schematic of an electrochemical cell 100 is shown in FIG. 5. The electrochemical cell 100 includes a negative electrode 102 separated from a positive electrode 104 by a porous separator 106. The negative electrode 102 may be formed from lithium metal or a lithium-insertion compound (e.g., graphite, silicon, tin, LiAl, LiMg, $Li_4Ti_5O_{12}$, $Cu_2Sb$), although Li metal affords the highest specific energy on a cell level compared to other candidate negative electrodes. Other metals may also be used to form the negative electrode, such as Zn, Mg, Na, Fe, Al, Ca, Si, and others.

The positive electrode 104 in this embodiment includes a current collector 108 and a porous matrix 112. A number of insulator particles 114 are attached to the porous matrix 112. The porous matrix 112 is an electrically conductive matrix formed from a conductive material such as conductive carbon, Silicon Carbide (SiC), or any other electronically conductive material that serves as the cathode structure. The separator 106 prevents the negative electrode 102 from electrically contacting the positive electrode 104.

The electrochemical cell 100 includes an electrolyte solution 116 present in the positive electrode 104 and in some embodiments in the separator 106. In the exemplary embodiment of FIG. 5, the electrolyte solution 116 includes a salt, $LiPF_6$ (lithium hexafluorophosphate), dissolved in an organic solvent mixture. The organic solvent mixture may be any desired solvent. In certain embodiments, the solvent may be dimethyl ether (DME), acetonitrile (MeCN), ethylene carbonate, or diethyl carbonate such as NMF, DMSO, ionic liquid for example).

A barrier 118 separates the positive electrode 104 from a reservoir 120. The reservoir 120 may be any vessel suitable to hold oxygen supplied to and emitted by the positive electrode 104. While the reservoir 120 is shown as an integral member of the electrochemical cell 100 attached to the positive electrode 104, in one embodiment the reservoir 120 is the positive electrode 104 itself. Various embodiments of the reservoir 120 are envisioned, including rigid tanks, inflatable bladders, and the like. In some embodiments, the reservoir is simply the atmosphere. In FIG. 5, the barrier 118 is a mesh which permits oxygen and other gases to flow between the positive electrode 104 and the reservoir 120 while also preventing the electrolyte 116 from leaving the positive electrode 104. Alternatively, the retention of cell components such as volatile electrolyte may be carried out separately from the individual cells, such that the barrier 118 is not required.

In the case in which the metal is Li, the electrochemical cell 100 discharges with lithium metal in the negative electrode 102 ionizing into a $Li^+$ ion with a free electron $e^-$. $Li^+$ ions travel through the separator 106 in the direction indicated by arrow 122 toward the positive electrode 104. Oxygen is supplied from the reservoir 120 through the barrier 118 as indicated by the arrow 124. Free electrons $e^-$ flow into the positive electrode 104 through the current collector 108 as indicated by arrow 126.

The oxygen atoms and $Li^+$ ions within the positive electrode 102 form a discharge product 132 inside the positive electrode 104, as depicted in FIG. 6. As seen in the following equations, during the discharge process metallic lithium is ionized, combining with oxygen and free electrons to form $Li_2O_2$ or $Li_2O$ discharge product that may coat the surfaces of the porous matrix 112.

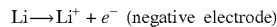
$Li \rightarrow Li^+ + e^-$ (negative electrode)

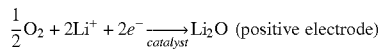
$\frac{1}{2}O_2 + 2Li^+ + 2e^- \xrightarrow{catalyst} Li_2O$ (positive electrode)

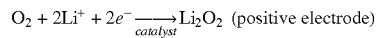
$O_2 + 2Li^+ + 2e^- \xrightarrow{catalyst} Li_2O_2$ (positive electrode)

In some embodiments, a catalyst may not be required for the $Li_sO_2$ equation.

The thickness of the discharge product 132 is limited to some 10's of nanometers as reported by Albertus et al., "Identifying Capacity Limitations in the Li/Oxygen Battery Using Experiments and Modeling", *Journal of the Electrochemical Society*, 158(3), A343-A351, 2011. In general, it is believed that $Li_2O_2$ nucleates on the surface of the carbon and the bulk electronic conductivity of $Li_2O_2$ is extremely low. It is further believed that $Li_2O_2$ particles grow due to high surface conductivity (i.e., "skin effect"). Accordingly, as the $Li_2O_2$ particles grow, they eventually join together on the surface of the carbon structure, thereby blocking the pathway of electrons from the carbon conductor to the $Li_2O_2$/electrolyte interface, where deposition occurs. By way of example, FIG. 7 depicts a portion of the electrode 104 wherein the porous electrode 112 does not include any insulator particles 114. As the cell 100 discharges, the discharge product $132_1$ and $132_2$ of FIG. 7 form on the nodule 134 of the porous electrode 112. Continued discharge of the cell 100 causes the discharge products $132_1$ and $132_2$ to swell as electrons travel, e.g., along the path 136 until the configuration of FIG. 8 is realized.

In FIG. 8, the discharge products $132_1$ and $132_2$ have swollen until they are in contact. Additionally, discharge products $132_3$ have formed, coating the entire surface of the nodule 134 of the porous electrode 112. Consequently, electrons cannot travel to the $Li_2O_2$/electrolyte interface from the nodule 134, and further formation of $Li_2O_2$ on the nodule 134 is precluded.

Figure 10:
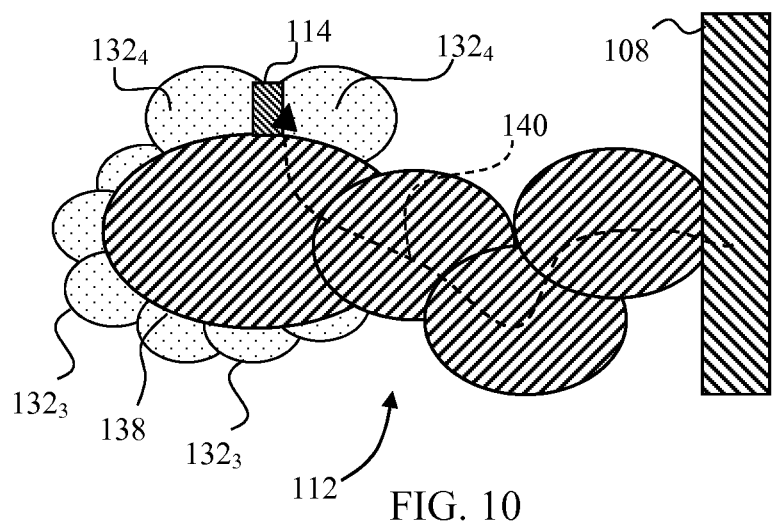
FIG. 10 depicts the portion of the porous electrode of FIG. 10 wherein further discharge products have formed because of the insulating particle/$Li_2O_2$ interface providing a pathway for electron transport, thereby allowing further electron transport to the $Li_2O_2$/electrolyte interface.

In contrast, FIG. 9 depicts the nodule 138 of FIG. 6 after continued discharge of the cell 100 has caused discharge product $132_3$ to coat the portions of the nodule 138 not covered by the insulator particle 114 or the discharge product 132 of FIG. 6, identified as discharge product $132_4$ in FIG. 9. Accordingly, with the exception of the portion of the nodule 138 covered by the insulator particle 114, the nodule 138 is coated with discharge product 132 to the same thickness as the discharge product 132 in FIG. 8 (i.e., discharge product $132_{1-3}$). The interface between the $Li_2O_2$ discharge product $132_4$ and the insulator particle 114 is different from the $Li_2O_2/Li_2O_2$ interface between the various discharge products 132. This allows for continued "skin effect" of the $Li_2O_2$ discharge products which contact the insulator particles 114, since an electron path 140 is available along the interface between the Li2O2 discharge product $132_4$ and the insulator particle 114. Accordingly, the discharge product $132_4$ is allowed to continue growing to a much larger size as depicted in FIG. 10. The capacity of the cell 100 is thus increased as a result of the inclusion of the insulator particles 114.

As is evident from a consideration of FIG. 10, by including a greater density of insulator particles 114, which also comprise semiconducting particles in some embodiments, the capacity of the cell 100 is further increased. The insulator particles 114 in one embodiment are distributed on the surface of the porous matrix 112 at an average spacing of at least 1 nm, up to 500 nm. The size of the insulator particles 114 (or semiconducting particles in some embodiments) is <100 nm, and preferably <20 nm. The insulator particles 114 are typically smaller than the carbon (or other electronically conductive) particles that make up the porous matrix 112. Diameter ratios of <0.5 are preferred, and <0.1 are even more preferred.

Figure 11:
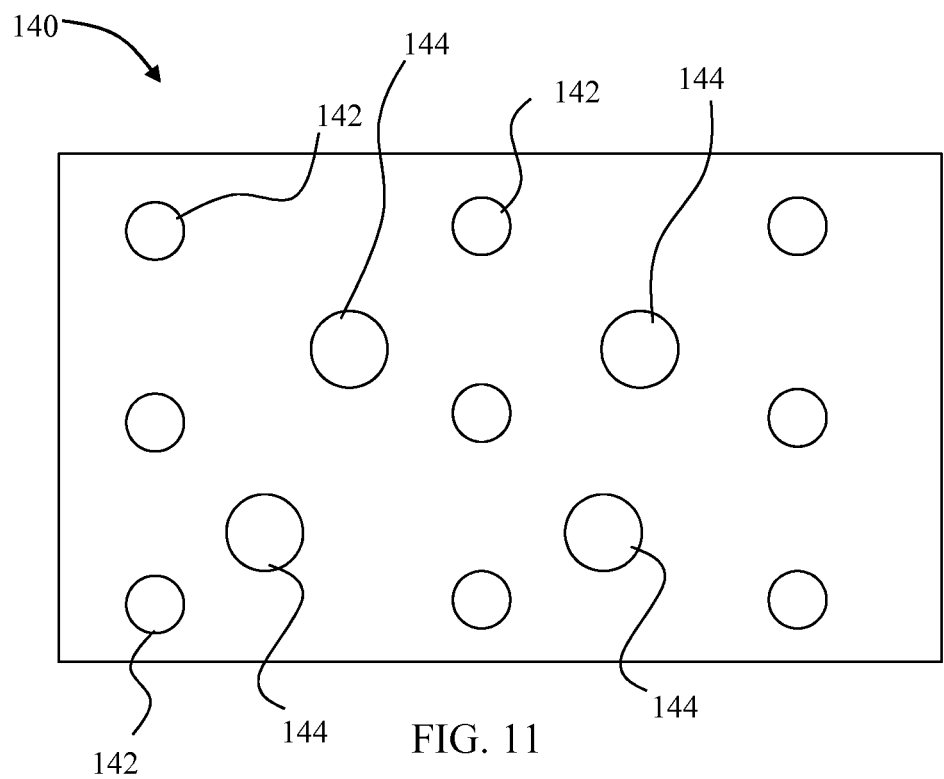
FIG. 11 depicts a portion of the porous electrode of FIG. 5 including a well distributed number of insulating particles on a nodule of the porous electrode.
Figure 12:
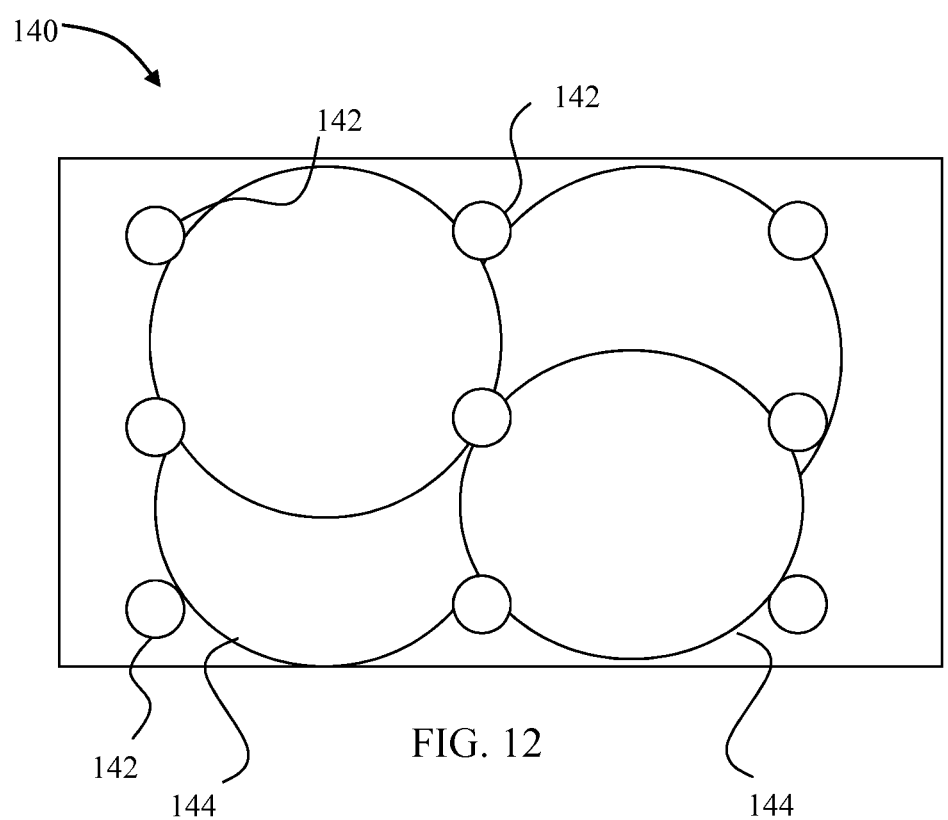
FIG. 12 depicts the porous electrode portion of FIG. 11 after discharge products have formed over substantially the entire surface of a nodule of the porous electrode, with the insulating particle/$Li_2O_2$ interface providing a pathway for electron transport, thereby allowing further electron transport to the $Li_2O_2$/electrolyte interface.

While FIG. 6 depicts a single insulating particle 114 on the nodule 138, a typical embodiment will include a number of insulating particles on a nodule. By way of example, FIG. 11 depicts a top plan view of a nodule 140 of a porous electrode with a number of evenly spaced insulating particles 142. The insulating particles 142 in one embodiment are semiconductive insulating particles. As discharge products 144 form and grow, the interface between the discharge products 144 and the insulating particles 142 provide a path for electrons to flow, even when the discharge products 144 grow to cover the entire nodule 140 (see FIG. 12) other than the locations at which the insulating particles 142 are attached to the nodule 140.

A porous electrode with insulating particles may be fashioned using processes familiar to those in the battery forming arts. In one embodiment, insulating (nano) particles are mixed with carbon particles during electrode preparation. This type of electrode preparation typically involves addition of particles to a solvent, and optionally some binder, to make a slurry, which is then coated on the current collector or gas diffusion layer of the electrode. The solvent is then evaporated from the coated electrode to leave behind pores that will later accommodate the electrolyte and/or gas channels. The insulating particles are added as an additional component to the slurry in an amount necessary to achieve the desired density. In other embodiments, the porous electrode with insulating particles is formed using CVD, physical vapor deposition, sputtering, etc.

The insulating particle 114 in various embodiments is made from one or more materials including oxides ($Al_2O_3$, $SiO_2$, $ZrO_2$, etc.), nitrides, carbides, silicides, sulfides, etc.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:

1. A metal/oxygen electrochemical cell, comprising:
    a negative electrode;
    a porous separator adjacent to the negative electrode; and
    a positive electrode separated from the negative electrode by the porous separator, the positive electrode including a conductive matrix and a plurality of insulator particles extending from the conductive matrix, wherein the cell is configured to coat at least a portion of the conductive matrix with a solid discharge product during discharge of the cell such that an electron path is formed at a respective interface between the solid discharge product and each of the plurality of insulator particles and wherein each of the plurality of insulator particles has an average spacing from an immediately adjacent one of the plurality of insulator particles of between 1 nanometer and 500 nanometers.

2. The cell of claim 1, wherein each of the plurality of insulator particles has a maximum size of less than 100 nanometers.

3. The cell of claim 2, wherein each of the plurality of insulator particles has a maximum size of less than 20 nanometers.

4. The cell of claim 1, wherein:
    the conductive matrix comprises a plurality of conductive particles;
    the plurality of conductive particles have a first maximum size;
    the plurality of insulator particles have a second maximum size; and
    the second maximum size is smaller than the first maximum size.

5. The cell of claim 4, wherein a diameter ratio of the plurality of insulator particles to the plurality of conductive particles is less than 0.5.

6. The cell of claim 5, wherein the diameter ratio of the plurality of insulator particles to the plurality of conductive particles is less than 0.1.

7. The cell of claim 5, wherein each of the plurality of insulator particles has a maximum size of less than 100 nanometers.

8. The cell of claim 7, wherein each of the plurality of insulator particles has an average spacing from each of the other of the plurality of insulator particles of between 1 nanometer and 500 nanometers.

9. The cell of claim 8, wherein the plurality of insulator particles comprise semiconductive insulating particles.

10. A method of forming a metal/oxygen electrochemical cell, comprising:
    forming a negative electrode;
    forming a porous separator:
    forming a positive electrode including a conductive matrix and a plurality of insulator particles extending from the conductive matrix;
    positioning the porous separator between the negative electrode and the positive electrode;
    configuring the cell to coat at least a portion of the conductive matrix with a solid discharge product during discharge of the cell such that an electron path is formed at a respective interface between the solid discharge product and each of the plurality of insulator particles, and
    wherein each of the plurality of insulator particles has an average spacing from an immediately adjacent one of the plurality of insulator particles of between 1 nanometer and 500 nanometers.

11. The method of claim 10, wherein forming a positive electrode comprises:
    mixing a plurality of insulating particles with a plurality of conductive particles in a solvent to form a slurry;
    coating the slurry on a current collector; and
    evaporating the solvent.

12. The method of claim 11, wherein mixing the plurality of insulating particles with the plurality of conductive particles comprises:
    mixing a plurality of conductive particles with a first maximum size with a plurality of insulator particles having a second maximum size wherein the second maximum size is smaller than the first maximum size.

13. The method of claim 11, wherein the plurality of insulator particles comprise semiconductive insulating particles.

14. The method of claim 11, wherein a diameter ratio of the plurality of insulator particles to the plurality of conductive particles is less than 0.5.

15. The method of claim 14, wherein the diameter ratio of the plurality of insulator particles to the plurality of conductive particles is less than 0.1.

16. The method of claim 11, wherein mixing the plurality of insulating particles with the plurality of conductive particles comprises:
    selecting a quantity of insulator particles such that each of the plurality of insulator particles has an average spacing from each of the other of the plurality of insulator particles of between 1 nanometer and 500 nanometers when the solvent is evaporated.

17. The method of claim 16, wherein each of the plurality of insulator particles has a maximum size of less than 100 nanometers.

18. The method of claim 10, wherein forming a positive electrode comprises:
    mixing a plurality of insulating particles with a plurality of conductive particles in a solvent to form a slurry;
    coating the slurry on a gas diffusion layer; and
    evaporating the solvent.

19. The method of claim 10, wherein forming the positive electrode comprises:
    forming the positive electrode using CVD, physical vapor deposition, or sputtering.

* * * * *